F. Bauschtliter,
Hydrant.

No. 89117.  Patented Apr. 20. 1869.

Witnesses:

Inventor: Frederick Bauschtliter
J. F. Reigart

FREDERICK BAUSCHTLIKER, OF WASHINGTON, DISTRICT OF COLUMBIA, ASSIGNOR TO HIMSELF AND FREDERICK GENTNER, OF SAME PLACE.

*Letters Patent No. 89,117, dated April 20, 1869.*

IMPROVEMENT IN HYDRANTS.

The Schedule referred to in these Letters Patent and making part of the same.

*To all whom it may concern:*

Be it known that I, FREDERICK BAUSCHTLIKER, of the city of Washington, District of Columbia, have invented an Improved Hydrant; and I hereby declare the following to be an exact description thereof, reference being had to the accompanying drawings, and to the letters of reference marked thereon, making a part of this specification, in which—

Figure 1:
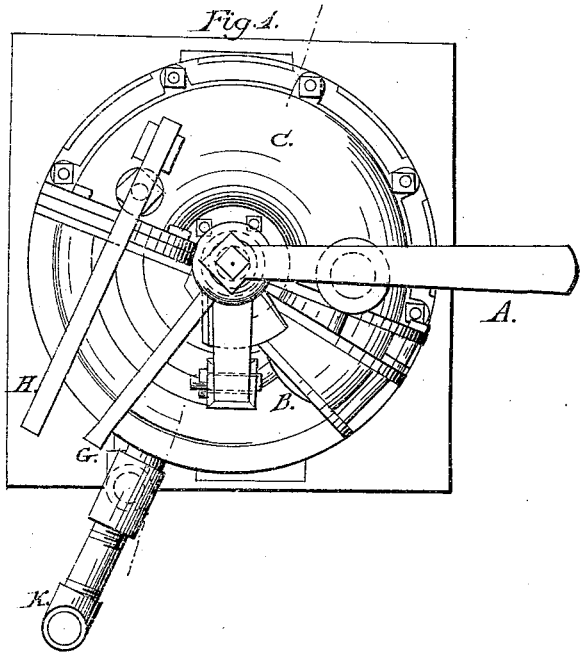
Figure 2:
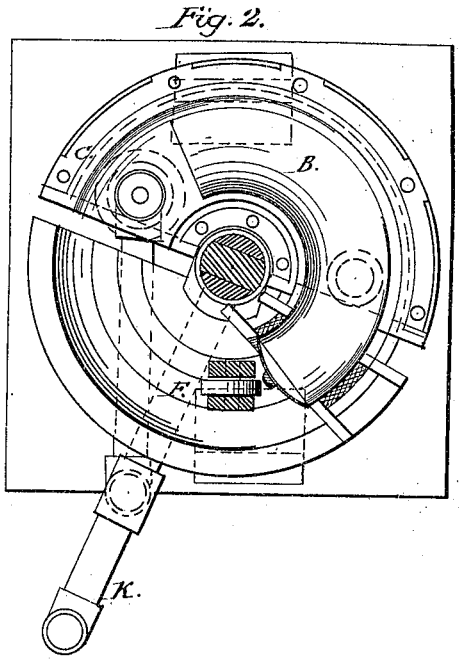
Figures 3, 5:
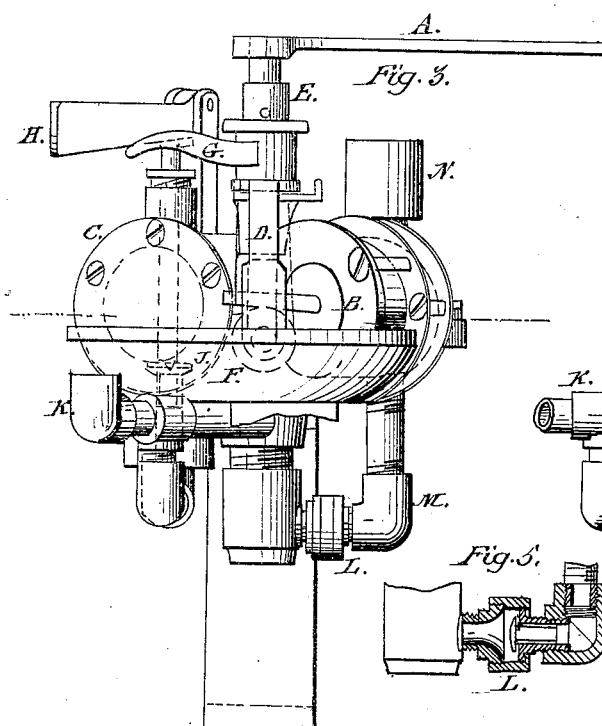
Figure 4:
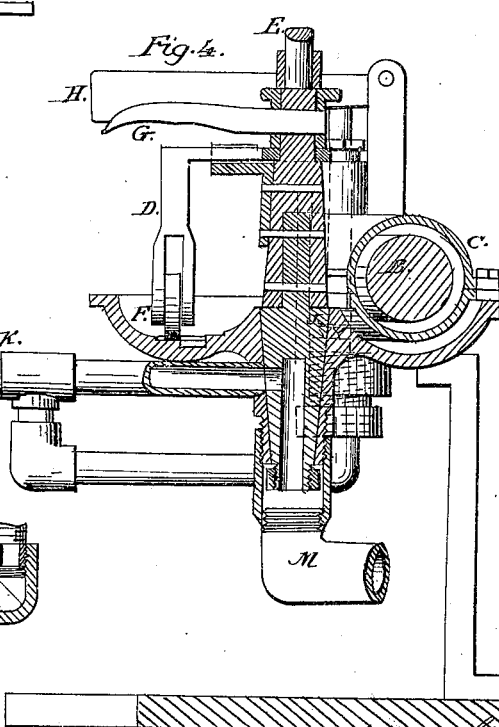

Figure 1 represents a top view of the hydrant.
Figure 2, a cross-section of the same.
Figure 3 is a perspective view of the side elevation.
Figure 4 is a vertical section of the same.
Figure 5 represents one of the valves.

The nature of my invention consists in the construction of a horizontal cylindrical hydrant, arranged with a receiving and discharge-pipe, also, receiving and discharge-valves, operated by levers, so as to turn the water on or off, and when turned off, the water is forced back into the main pipe beneath, so as to prevent its freezing in the winter.

A represents the main lever at the top, by which the pipes are opened or closed, as the plunger B is moved backward or forward in the cylinder C.

An angular arm, D, attached to the revolving upright shaft E, operates upon a wheel, F, and moves the plunger B backward and forward, corresponding with the movement of the lever A.

An arm, G, projecting also from the shaft E, moves under the lever H, raising it, and thus frees the valve J, in the lower side and front of the cylinder C, and forcing the water out of the discharge-pipe K, and as the lever A is reversed, the lever H again falls upon the stem of the valve J, shutting off the flow of water from the discharge-pipe, opening the valve L, and forcing the water down into the supply-pipe M, and retaining it there, so as to prevent the water from freezing.

N is an air-chamber upon the top of the cylinder C.

What I claim as my invention, and desire to secure by Letters Patent, is—

The arrangement of the plunger B and valve J, in the cylinder C, lever H, and arms G and D, with the supply and discharge-pipes, when combined and operating as herein described, and for the purpose set forth.

FREDRCK. BAUSCHTLIKER.

Witnesses:
E. D. MAYHEW,
J. FRANKLIN REIGART.